US012098736B2

(12) United States Patent
Hornbostel et al.

(10) Patent No.: US 12,098,736 B2
(45) Date of Patent: Sep. 24, 2024

(54) SELF-PIERCING RIVET JOINT AND SELF-PIERCING RIVET

(71) Applicant: AUDI AG, Ingolstadt (DE)

(72) Inventors: Norbert Hornbostel, Talheim (DE); Heiko Hellmeier, Heilbronn (DE); Frank Björn Barkhausen, Heilbronn (DE)

(73) Assignee: AUDI AG, Ingolstadt (DE)

( * ) Notice: Subject to any disclaimer, the term of this patent is extended or adjusted under 35 U.S.C. 154(b) by 499 days.

(21) Appl. No.: 17/430,609

(22) PCT Filed: Mar. 20, 2020

(86) PCT No.: PCT/EP2020/057729
§ 371 (c)(1),
(2) Date: Aug. 12, 2021

(87) PCT Pub. No.: WO2020/200832
PCT Pub. Date: Oct. 8, 2020

(65) Prior Publication Data
US 2022/0145921 A1    May 12, 2022

(30) Foreign Application Priority Data
Apr. 4, 2019 (DE) .................... 10 2019 204 826.9

(51) Int. Cl.
*F16B 19/08*    (2006.01)
*B21J 15/02*    (2006.01)

(52) U.S. Cl.
CPC ........... *F16B 19/086* (2013.01); *B21J 15/025* (2013.01)

(58) Field of Classification Search
CPC .......... F16B 5/04; F16B 19/06; F16B 19/086; F16B 39/00; B21J 15/025
(Continued)

(56) References Cited

U.S. PATENT DOCUMENTS 6,325,584 B1* 12/2001 Marko .................. B21J 15/025
411/501
6,988,862 B1* 1/2006 Iguchi ................ F16B 19/1027
411/501
(Continued)

FOREIGN PATENT DOCUMENTS

CN    105980717 A    9/2016
CN    106133342 A    11/2016
(Continued)

OTHER PUBLICATIONS

Office Action issued on Feb. 23, 2023, in corresponding Chinese Application No. 202080024372.1, 12 pages.
(Continued)

*Primary Examiner* — William D Hutton, Jr.
*Assistant Examiner* — Carl J Carlson
(74) *Attorney, Agent, or Firm* — Maier & Maier, PLLC

(57) ABSTRACT

A self-piercing rivet joint, having at least two components made of formable metallic materials having a strength up to 300 MPa, which are connected to one another in a riveting procedure, in which a self-piercing rivet pierces the first, stamp-side component with a setting force and is driven into the second, die-side component, specifically while maintaining a residual base thickness in the second component and while spreading out the self-piercing rivet to a spreading diameter in the second component. The self-piercing rivet is compressed after the riveting procedure down to 60% of its starting length and the spreading diameter is enlarged up to 140% to 150%, in particular to up to 140% of the rivet shaft diameter, specifically without damaging the self-piercing rivet by self-piercing rivet material cracks.

20 Claims, 2 Drawing Sheets

(58) Field of Classification Search
USPC .......................................... 411/176, 502, 501
See application file for complete search history.

(56) References Cited

U.S. PATENT DOCUMENTS

| | | | | |
|---|---|---|---|---|
| 7,628,573 | B2* | 12/2009 | Philipskotter | ......... F16B 19/086 |
| | | | | 411/501 |
| 8,070,406 | B2* | 12/2011 | Trinick | ................ F16B 19/086 |
| | | | | 411/501 |
| 9,364,885 | B2* | 6/2016 | Trinick | ................ F16B 19/086 |
| 10,371,190 | B2* | 8/2019 | Wissling | ................ B21J 15/36 |
| 10,465,730 | B2* | 11/2019 | Hofmann | .................. F16B 5/04 |
| 2013/0094924 | A1* | 4/2013 | Lee | ....................... F16B 19/086 |
| | | | | 411/502 |
| 2013/0336745 | A1* | 12/2013 | Trinick | ................. B21J 15/025 |
| | | | | 411/501 |
| 2015/0183022 | A1* | 7/2015 | Trinick | ................. B21J 15/025 |
| | | | | 29/524.1 |

FOREIGN PATENT DOCUMENTS

| | | |
|---|---|---|
| CN | 108291566 A | 7/2018 |
| DE | 19700627 A1 | 7/1997 |
| DE | 102013020504 A1 | 6/2015 |
| DE | 202016102528 U1 | 8/2017 |
| EP | 0833063 A1 | 4/1998 |
| EP | 3633215 A1 | 4/2020 |
| WO | 2006087984 A1 | 8/2006 |

OTHER PUBLICATIONS

Office Action issued on Aug. 17, 2022, in connection with corresponding Chinese Application No. 202080024372.1 (14 pp., including English-language translation).
Office Action issued on Nov. 29, 2023, in corresponding European Application No. 20713566.6, 10 pages.
International Search Report issued on Jun. 8, 2020 in corresponding Application No. PCT/EP2020/057729; 6 pages; Machine translation attached.
German Office Action issued on Oct. 8, 2019 in corresponding Application No. 10 2019 204 826.9; 20 pages.
Budde L et al., "Further development of punch riveting technology" Sheet Metal Tubes Profiles, Meisenbach, Bamberg, DE, vol. 39, No. 4, Jan. 1, 1992 (Jan. 1, 1992), pp. 310-314, 10 pgs.
International Preliminary Report on Patentability issued on Sep. 28, 2021 in corresponding Application No. PCT/EP2020/057729; 15 pages.
German Office Action, issued on Sep. 14, 2022, in corresponding German Patent Application No. 10 2019 204 826.9; 8 pages.

* cited by examiner

SELF-PIERCING RIVET JOINT AND SELF-PIERCING RIVET

FIELD

The invention relates to a self-piercing rivet joint and a self-piercing rivet for such a self-piercing rivet joint. The invention includes joining components made of formable metallic materials having a low strength up to 300 MPa, in particular to the joining of aluminum materials.

BACKGROUND

The self-piercing rivet joint according to the invention is preferably used in automobile construction. In this case, the self-piercing rivet joint is designed especially with regard to the dynamic loads and/or crash loads occurring in vehicles. In automobile construction, the production of a vehicle body takes place in a fully automatic process chain, in which, for example, aluminum semifinished products (sheet-metal materials and cast materials as well as profiles) are provided, are joined together by means of a self-piercing rivet joint, and are then painted, for example, in a cathodic dip painting (KTL) process.

In a generic self-piercing rivet joint, at least two components made of formable metallic materials of a strength of 300 MPa are connected to one another in a riveting procedure. In the riveting procedure, a self-piercing rivet pierces the first, stamp-side component with a setting force and is driven into the second, die-side component. This takes place while maintaining a residual base thickness in the second, die-side component and while spreading out the self-piercing rivet to a spreading diameter in the second component to produce an undercut. The self-piercing rivet can be produced from a wire material, such as a cold heading steel, and can be surface-finished using a corrosion layer.

Such a conventional self-piercing rivet has an internal bore having a comparatively large bore depth. The self-piercing rivet can be manufactured, for example, in a total of five stages, of which two stages are required for the production of the internal bore. Moreover, the problem exists in the conventional self-piercing rivet (due to its scooped geometry because of the deep internal bore) in the dip-centrifuging method or in other coating methods that the coating material flows into the self-piercing rivet internal bore and closes the internal bore.

A self-piercing rivet for connecting high-strength steels is known from DE 10 2013 020 504 A1, which has an arc-shaped inner curvature on a shaft end of the self-piercing rivet. A self-piercing rivet for joining two aluminum plates is known from EP 0 833 063 A. A self-piercing rivet for connecting two workpieces, in particular made of high-strength steels, is known from DE 20 2016 102 528 U1.

SUMMARY

The object of the invention is to provide a self-piercing rivet joint and a self-piercing rivet which is easily producible in comparison to the prior art and is usable for a greater number of material thickness combinations of the components to be joined.

According to the characterizing part of claim 1, the self-piercing rivet is designed so that it can be compressed after the riveting procedure down to 60% of its starting length in the non-deformed state and simultaneously the spreading diameter can be enlarged up to 140% to 150% of the rivet shaft diameter, but in particular only to 135 to 140% of the rivet shaft diameter, without the self-piercing rivet being damaged by material cracks.

In one technical implementation, the still undeformed self-piercing rivet can have a cylindrical rivet shaft having a flat inner curvature open toward the shaft tip and a rivet head larger in diameter with respect to the rivet shaft diameter. The inner curvature is only worked with less curvature depth into the shaft tip in comparison to a conventional self-piercing rivet—with simple manufacturing. Because of the low curvature depth—in contrast to the prior art—scooped self-piercing rivet geometry is not present. Therefore, no problems result in the dip-centrifuging method or in other coating methods. The inner curvature can be formed in the shape of a spherical cap, cone, or truncated cone.

The base material of the self-piercing rivet can preferably have a significantly lower hardness (or strength) in comparison to conventional self-piercing rivets, but a significantly greater ductility. The hardness of the self-piercing rivet in the starting state without strain hardening can preferably be between 200 HV1 and 320 HV1, in particular between 250 HV1 and 300 HV1. This approximately corresponds to a strength between 600 MPa and 1000 MPa, in particular between 750 MPa and 900 MPa.

The core of the invention relates to the substantive matter that the comparatively low strength of the self-piercing rivet in combination with the self-piercing rivet geometry described later results in a special self-piercing rivet compression behavior during the setting process. Greatly differing material thicknesses can be joined especially on the die side using a rivet geometry and a die geometry. This is because we are rather restricted with respect to the material strength of the stamp-side partner due to the low hardness and the low internal bore depth in relation to the known self-piercing rivet elements. The material thickness ratio between the stamp-side component and the die-side component can preferably be anywhere between 1:1 and 1:3.

The starting point of the invention is thus a self-piercing rivet which is significantly simpler to produce in comparison to a conventional semi-hollow self-piercing rivet, which only has a flat inner curvature on the shaft tip instead of a deep inner curvature. The self-piercing rivet having the flat inner curvature on its shaft tip is refined with regard to the above-described pronounced compression capability. For this compression capability, in particular the self-piercing rivet material, the self-piercing rivet head shaped (for the setting force introduction), and the self-piercing rivet base geometry (for the setting force dissipation) are relevant: The head shape can be a countersunk head having a planar rivet head upper side. The rivet head upper side can merge on the radial outside on a head upper edge into a circumferential head boundary, which extends in the axial direction over a head lateral height to a head lower edge. The rivet head lower side adjoins at the head lower edge, which merges in the direction of the shaft tip into the diameter-reduced rivet shaft. The shaft tip has a ring-shaped circumferential placement edge, which delimits the inner curvature, and at which the wall of the inner curvature runs together with the rivet shaft outer circumference. The compression capability according to the invention can preferably be assisted by a soft self-piercing rivet material in comparison to the prior art. Particularly preferred dimensional specifications, which are also significant for the compression capability, are described in the aspects of the invention listed individually hereinafter.

The inner curvature can thus preferably protrude into the rivet shaft starting from the shaft tip in the undeformed rivet state with a curvature depth in the axial direction. The curvature depth can be between 10% and 25%, in particular 15%, of the self-piercing rivet total length. In this way, a rivet head material thickness (this means the material thickness of the self-piercing rivet along the self-piercing rivet longitudinal axis) between 75% and 90%, in particular 85%, of the self-piercing rivet total length. The rivet head material thickness is measured along the rivet longitudinal axis between a rivet head upper side and the spherical-cap-shaped inner curvature. The above rivet head can thus provide a sufficiently large amount of material for the material flow during the riveting procedure.

It is advantageous with regard to a sufficiently high connection strength of the self-piercing rivet joint if after completed setting process (that is to say riveting procedure), the self-piercing rivet inner curvature is filled essentially completely by the self-piercing rivet material due to material flow. The shaft tip therefore preferably has an essentially planar end face after the riveting procedure.

During the setting process, the material tension is greatest in particular at the transition between the rivet shaft and the rivet head. To avoid material cracks at the rivet head-rivet shaft transition, it can preferably be implemented as follows: The transition can have a rounded rivet head lower side having uniform head radius. The rounded rivet head lower side can merge tangentially radially outward into a level, conical rivet head lower side, which extends up to a rivet head edge. The level, conical rivet head lower side can be set diagonally upward by a cone angle in the direction of the rivet head upper side in relation to a transverse plane. It is preferred if the above head radius is between 0.8 mm and 2.0 mm. The cone angle can be in an order of magnitude of 20°. A radially outer rivet head edge can extend over a head lateral height, which can be in particular approximately 0.3 mm, between the rivet head lower side and the rivet head upper side.

To further assist a perfect compression behavior, it is preferred if the self-piercing rivet is not implemented as a round head rivet having a mushroom-shaped rivet head, but as a countersunk head rivet (or flat head rivet) having a level rivet head upper side. In the self-piercing rivet joint, the rivet head upper side of the flat head rivet can be aligned surface flush, that is to say without head protrusion, with the surface of the first, stamp-side component, and not raised in relation to the integrated component surface.

The cutting edge geometry formed at the rivet base, that is to say at the shaft tip, can have a ring-shaped, circumferential placement edge delimiting the inner curvature. The placement edge presses during the setting process as a cutting edge, using which, on the one hand, early compression of the self-piercing rivet is prevented and, on the other hand, spreading out of the self-piercing rivet by a predefined spreading dimension radially outward is controlled. Preferably, an inner wall of the self-piercing rivet inner curvature and a rivet shaft outer circumference can run together at an acute angle with a cutting edge angle of, for example, 45° at the placement edge. The placement edge can be rounded with a rounding radius in the range of 0.15 mm.

In the undeformed rivet state, the total length of the self-piercing rivet can be in a range of 4 mm to 8 mm, in particular between 4.5 mm and 6.0 mm. The rivet head diameter can be in a range of 4.5 to 8.5 mm, in particular 5.5 mm or 7.75 mm, while the rivet shaft diameter can be in a range of 2.8 mm to 6.6 mm Such a rivet shaft diameter is processable using known rivet machines.

Using the self-piercing rivet according to the invention, the material thickness ratio between the first, stamp-side component and the second, die-side component can be between 1:1 and 1:3. The material thickness of the first, stamp-side component can preferably be less than or equal to 1.3 mm here.

BRIEF DESCRIPTION OF THE FIGURES

An exemplary embodiment of the invention is described hereinafter on the basis of the appended figures.

In the figures.

DETAILED DESCRIPTION

Figure 2:
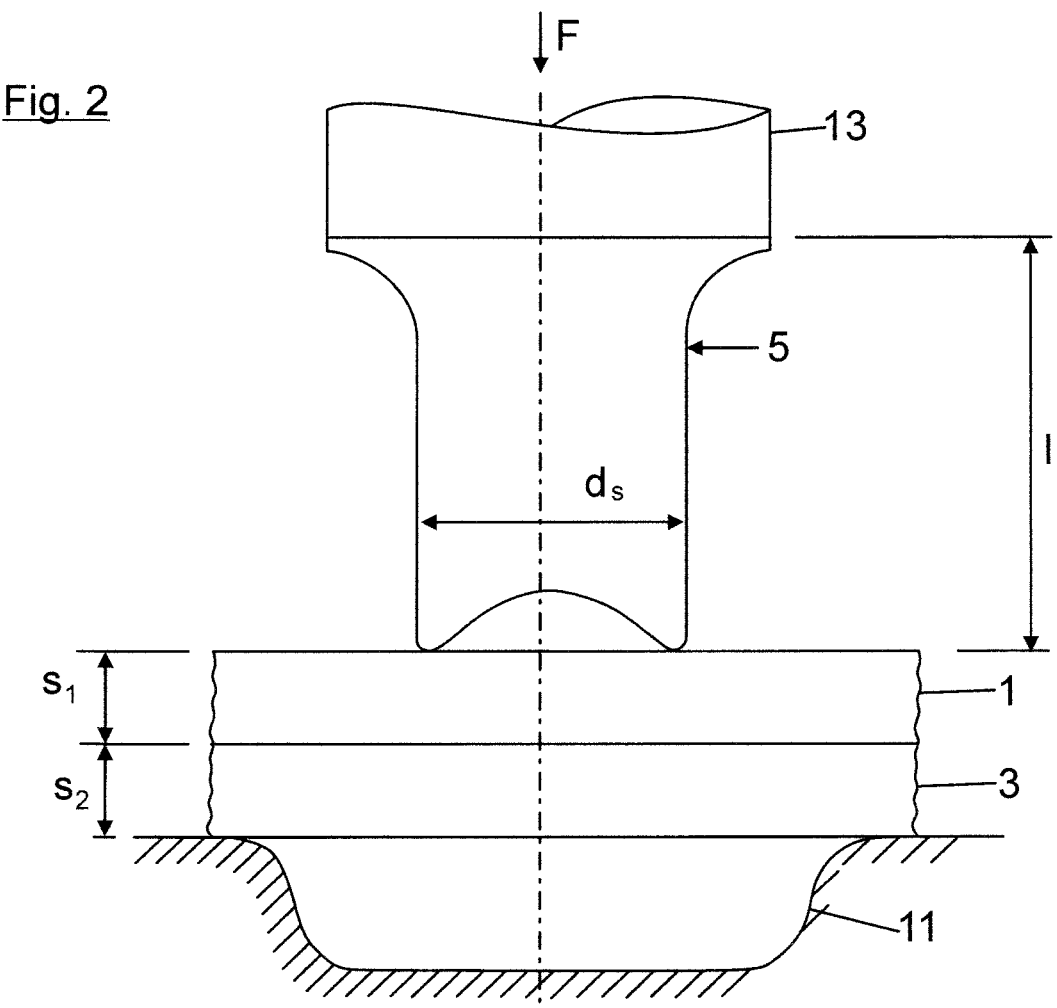
FIG. 2 shows a rough schematic illustration of a self-piercing rivet located in a setting tool before carrying out the setting process.
Figure 3:
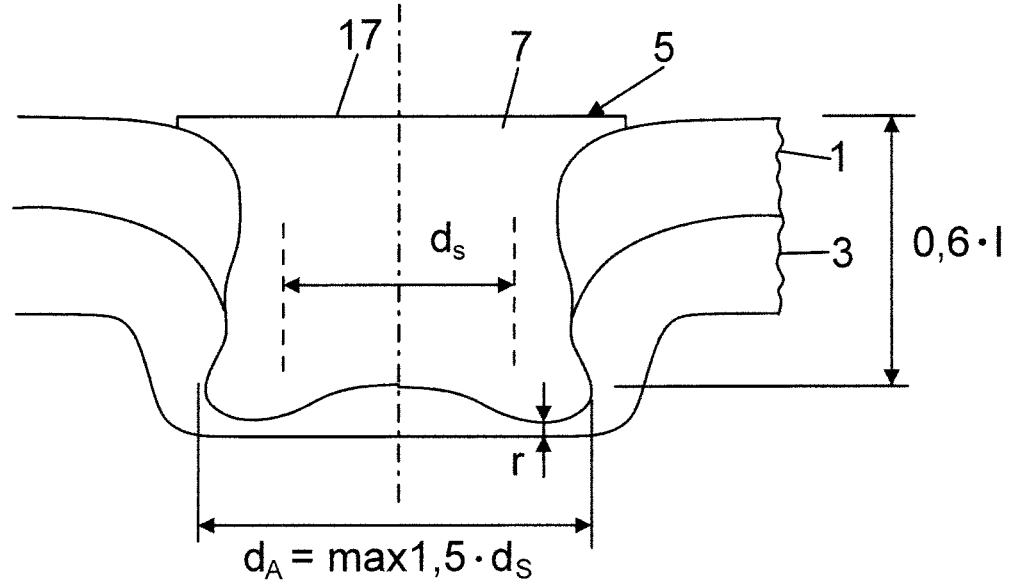
FIG. 3 shows a self-piercing rivet joint.

FIG. 3 shows a finished self-piercing rivet joint, in which a stamp-side aluminum plate part 1 and a die-side aluminum plate part 3 are connected to one another by means of a self-piercing rivet 5. The two aluminum plate parts 1 have approximately equal material thicknesses $s_1$, $s_2$ in FIG. 2 or 3. The self-piercing rivet 5 has a rivet head 7 and a rivet shaft 9. In the figures, the self-piercing rivet 5 is implemented as a flat head rivet having a level, plane-parallel rivet head upper side 17. The rivet head upper side 17 is aligned surface-flush with the surface of the component 1 in FIG. 3.

To prepare the setting process, the two components 1, 3 are placed on a die 11 of the setting tool lying one on top of another and compressed by means of a hold-down system (not shown) using a hold-down force. Subsequently, the self-piercing rivet 5 is driven by means of a stamp 13 using a setting force F into the two components 1, 3. During the setting process, the self-piercing rivet 5 pierces the material of the stamp-side component 1 and is driven therein up into the second component 3, specifically while maintaining a residual base thickness r (FIG. 3) of the stamp-side component 3 and with spreading out of the self-piercing rivet 5 to a spreading diameter $d_A$ in the second component 3 to create an undercut.

Figure 1:
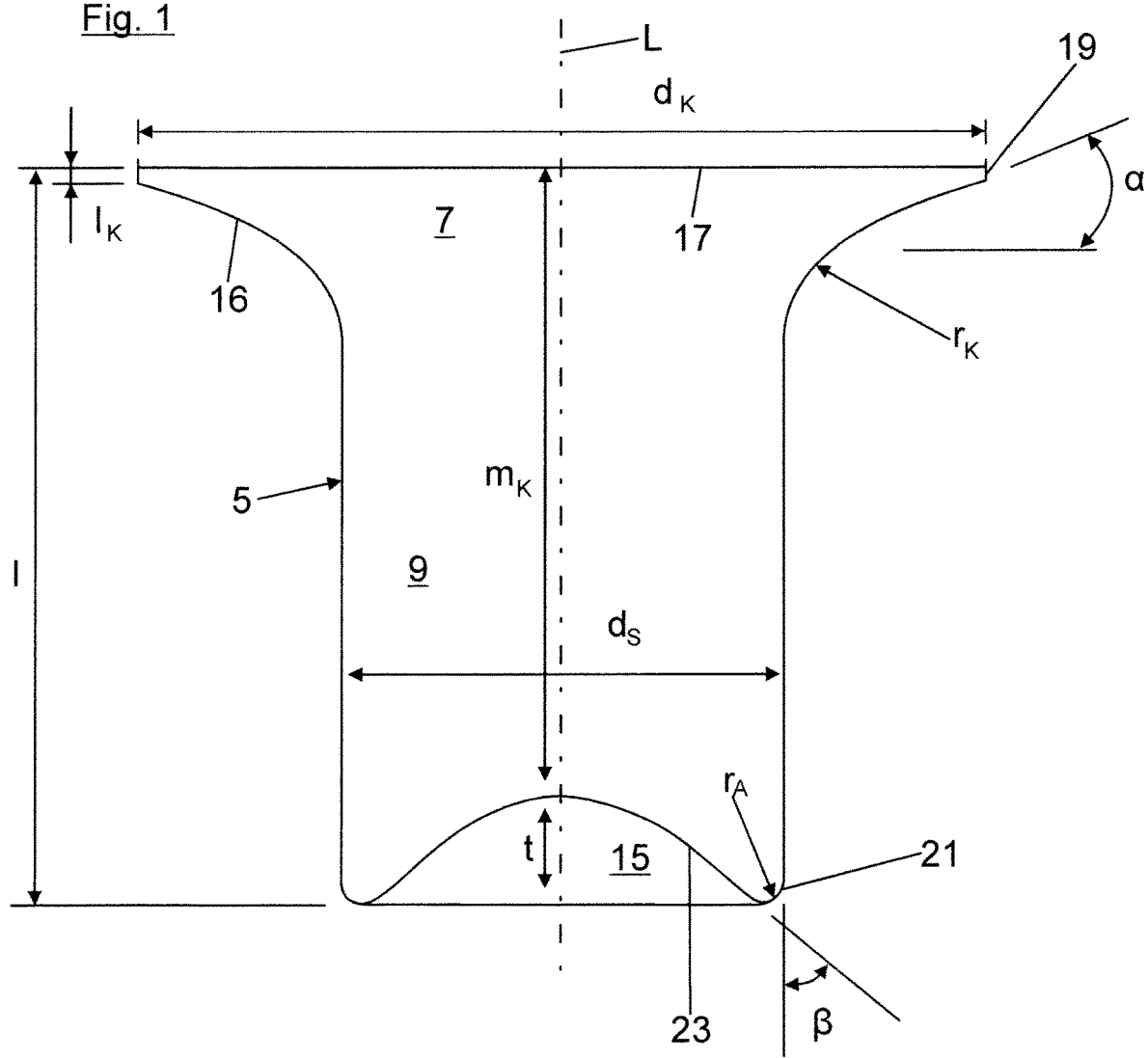
FIG. 1 shows a microsection of a self-piercing rivet in the undeformed state.

In the following, the self-piercing rivet 5 alone is described on the basis of FIG. 1: Accordingly, the rotationally-symmetrical self-piercing rivet 5 has an open, spherical-cap-shaped inner curvature 15 open toward the shaft tip, which protrudes with a curvature depth t in the axial direction into the rivet shaft 9. The curvature depth t in FIG. 1 is 15% of the self-piercing rivet total length I. Vice versa, the rivet head material thickness $m_K$, which extends along the rivet longitudinal axis L between a rivet head upper side 17 and the inner curvature 15, is 85% of the self-piercing rivet total length I. The transition between the rivet shaft 9 and the rivet head 7 is formed in FIG. 1 by a rounded rivet head lower side 16 having uniform head radius $d_K$, which is 1 mm, for example. The rounded rivet head lower side 16 merges tangentially radially outward into a level, conical rivet head lower side, which extends to a rivet head edge 19. In FIG. 1, the level, conical rivet head lower side is set diagonally upward in the direction of rivet head upper side 17 by a cone angle α (FIG. 1) of approximately 20° in relation to a transverse plane. The radially outer circumferential rivet head edge 19 extends with a head lateral height $l_K$ of approximately 0.3 mm between the rivet head lower side 16 and the rivet head upper side 17.

A ring-shaped circumferential placement edge 21 delimiting the inner curvature 15 is formed on the shaft tip facing away from the rivet head 7. An inner wall 23 of the self-piercing rivet inner curvature 15 and a rivet shaft outer circumference run together at an acute angle at the placement edge 21, specifically at an edge angle β of approximately 45°. The placement edge 21 is rounded in FIG. 1 with a rounding radius $r_a$ of 0.15 mm.

In FIG. 1, the total length I of the self-piercing rivet 5 in the undeformed state is 5 mm, the rivet head diameter $d_K$ is 5.5 mm, and the rivet shaft diameter $d_S$ is 2.9 mm. The base material of the self-piercing rivet 5 is a cold heading steel. Its strength in the starting state without strain hardening is 750 to 900 MPa.

The comparatively low strength of the self-piercing rivet 5 results, in combination with the above-described self-piercing rivet geometry, in a special self-piercing rivet compression behavior, in which the self-piercing rivet 5 is compressed after the setting process to 60% of its starting length I (FIG. 2) and the spreading diameter $d_A$ is enlarged to 135% to 150% of the rivet shaft diameter $d_S$, without material cracks occurring in the self-piercing rivet 5. As can furthermore be seen from FIG. 3, after the setting process, the self-piercing rivet inner curvature 15 is essentially completely filled up by the self-piercing rivet material due to material flow. The shaft tip of the self-piercing rivet 15 is therefore an essentially planar end face in FIG. 3.

LIST OF REFERENCE SIGNS 1 stamp-side component
3 matrix-side component
5 self-piercing rivet
7 rivet head
9 rivet shaft
11 die
13 stamp
15 inner curvature
16 rivet head lower side
17 rivet head upper side
19 rivet head boundary
21 placement edge
23 inner wall
$d_S$ rivet shaft diameter
$d_K$ rivet head diameter
$d_A$ spreading diameter
$r_K$ head radius
α cone angle
β placement edge angle
$r_A$ rounding angle of the placement edge
I self-piercing rivet total length
$l_K$ head lateral height
$m_K$ rivet head material thickness
t curvature depth of the inner curvature
r residual base thickness
L self-piercing rivet longitudinal axis
$s_1$, $s_2$ material thicknesses
F setting force

The invention claimed is:

1. A self-piercing rivet joint, comprising:
a stamp-side component; and
a die-side component, wherein both components are made of formable aluminum materials having a strength up to 300 MPa, which are connected to one another in a riveting procedure, in which a self-piercing rivet pierces the stamp-side component with a setting force and is driven into the die-side component, while maintaining a residual base thickness in the die-side component and while spreading out the self-piercing rivet to a spreading diameter in the die-side component, wherein the self-piercing rivet is compressed after the riveting procedure down to 60% of its starting length and the spreading diameter is enlarged up to between 135% and 140% of the rivet shaft diameter, without damaging the self-piercing rivet by self-piercing rivet material cracks.

2. The self-piercing rivet joint as claimed in claim 1, wherein the still undeformed self-piercing rivet has a cylindrical rivet shaft having an inner curvature, which is open toward the shaft tip and is spherical-cap-shaped, and a rivet head larger in diameter in relation to the rivet shaft diameter, and
after the riveting procedure, the self-piercing rivet inner curvature is completely filled up by self-piercing rivet material due to material flow during the riveting procedure, and wherein the shaft tip has a planar end face after the riveting procedure, or a rounded end face having a large radius in relation to the rivet dimensions.

3. The self-piercing rivet joint as claimed in claim 1, wherein the inner curvature, in the undeformed state, protrudes starting from the shaft tip with a curvature depth in the axial direction into the rivet shaft, and wherein the curvature depth is substantially 15% of the self-piercing rivet total length, and the rivet head material thickness, which extends along the rivet longitudinal axis between a rivet head upper side and the inner curvature, is substantially 85% of the self-piercing rivet total length.

4. The self-piercing rivet joint as claimed in claim 2, wherein the transition between the rivet shaft and the rivet head is formed by a rounded rivet head lower side having uniform head radius, the rounded rivet head lower side merges tangentially radially outward into a planar, conical rivet head lower side, which extends up to a rivet head boundary, the planar, conical rivet head lower side is set diagonally upward in the direction of the rivet head upper side by a cone angle in relation to a horizontal plane, the head radius is between 0.8 mm and 2.0 mm, and the cone angle is substantially 20°.

5. The self-piercing rivet joint as claimed in claim 1, wherein the self-piercing rivet is a flat head rivet having a planar rivet head upper side, and in that, in the self-piercing rivet joint, the rivet head upper side is aligned surface flush, without head protrusion, with the surface of the stamp-side component, and is not raised in relation to the integral component surface, and wherein a circumferential rivet head boundary extends radially outward between the rivet head lower side and the rivet head upper side over a head lateral height, and wherein the head lateral height is substantially 0.3 mm.

6. The self-piercing rivet joint as claimed in claim 1, wherein on the shaft tip facing away from the rivet head, a ring-shaped circumferential placement edge delimiting the inner curvature is formed, and wherein the placement edge acts as a cutting edge during the riveting procedure, using which, early compression of the self-piercing rivet can be suppressed, and spreading out of the self-piercing rivet by a predefined spreading amount radially outward is controllable, and wherein a wall of the self-piercing rivet inner curvature and a rivet shaft outer circumference run together at an edge angle of substantially 45°, at the placement edge, and the placement edge is rounded with a rounding radius of substantially 0.15 mm.

7. The self-piercing rivet joint as claimed in claim 1, wherein in the undeformed state, the self-piercing rivet total length is between 4.5 mm and 6.0 mm, the rivet head diameter is between 5.5 mm and 7.75 mm, and the rivet shaft diameter is between 2.8 mm and 6.6 mm.

8. The self-piercing rivet joint as claimed in claim 1, wherein the base material of the self-piercing rivet is a wire material made of cold extrusion steel or cold heading steel, the self-piercing rivet has a low strength in comparison to conventional self-piercing rivets, but significantly greater ductility, and the strength of the self-piercing rivet in the starting state without strain hardening is between 750 MPa and 900 MPa.

9. The self-piercing rivet joint as claimed in claim 1, wherein the material thickness ratio between the stamp-side component and the die-side component is between 1:1 and 1:3, and the material thickness of the stamp-side component is less than or equal to 1.3 mm.

10. A self-piercing rivet for the self-piercing rivet joint as claimed in claim 1.

11. The self-piercing rivet joint as claimed in claim 3, wherein the transition between the rivet shaft and the rivet head is formed by a rounded rivet head lower side having uniform head radius, the rounded rivet head lower side merges tangentially radially outward into a planar, conical rivet head lower side, which extends up to a rivet head boundary, the planar, conical rivet head lower side is set diagonally upward in the direction of the rivet head upper side by a cone angle in relation to a horizontal plane, the head radius is between 0.8 mm and 2.0 mm, and the cone angle is substantially 20°.

12. The self-piercing rivet joint as claimed in claim 2, wherein the self-piercing rivet is a flat head rivet having a planar rivet head upper side, and in that, in the self-piercing rivet joint, the rivet head upper side is aligned surface flush without head protrusion, with the surface of the stamp-side component, and is not raised in relation to the integral component surface, a circumferential rivet head boundary extends radially outward between the rivet head lower side and the rivet head upper side over a head lateral height, the head lateral height is substantially 0.3 mm.

13. The self-piercing rivet joint as claimed in claim 3, wherein the self-piercing rivet is a flat head rivet having a planar rivet head upper side, and in that, in the self-piercing rivet joint, the rivet head upper side is aligned surface flush without head protrusion, with the surface of the stamp-side component, and is not raised in relation to the integral component surface, a circumferential rivet head boundary extends radially outward between the rivet head lower side and the rivet head upper side over a head lateral height, and the head lateral height is substantially 0.3 mm.

14. The self-piercing rivet joint as claimed in claim 4, wherein the self-piercing rivet is a flat head rivet having a planar rivet head upper side, and in that, in the self-piercing rivet joint, the rivet head upper side is aligned surface flush, without head protrusion, with the surface of the stamp-side component, and is not raised in relation to the integral component surface, a circumferential rivet head boundary extends radially outward between the rivet head lower side and the rivet head upper side over a head lateral height, and the head lateral height is substantially 0.3 mm.

15. The self-piercing rivet joint as claimed in claim 2, wherein on the shaft tip facing away from the rivet head, a ring-shaped circumferential placement edge delimiting the inner curvature is formed, the placement edge acts as a cutting edge during the riveting procedure, using which, early compression of the self-piercing rivet can be suppressed, and, spreading out of the self-piercing rivet by a predefined spreading amount radially outward is controllable, and a wall of the self-piercing rivet inner curvature and a rivet shaft outer circumference run together at an edge angle of substantially 45°, at the placement edge, and the placement edge is rounded with a rounding radius of substantially 0.15 mm.

16. The self-piercing rivet joint as claimed in claim 3, wherein on the shaft tip facing away from the rivet head, a ring-shaped circumferential placement edge delimiting the inner curvature is formed, the placement edge acts as a cutting edge during the riveting procedure, using which, early compression of the self-piercing rivet can be suppressed, and, spreading out of the self-piercing rivet by a predefined spreading amount radially outward is controllable, a wall of the self-piercing rivet inner curvature and a rivet shaft outer circumference run together at an edge angle of substantially 45°, at the placement edge, and the placement edge is rounded with a rounding radius of substantially 0.15 mm.

17. The self-piercing rivet joint as claimed in claim 4, wherein on the shaft tip facing away from the rivet head, a ring-shaped circumferential placement edge delimiting the inner curvature is formed, the placement edge acts as a cutting edge during the riveting procedure, using which, early compression of the self-piercing rivet can be suppressed, and, spreading out of the self-piercing rivet by a predefined spreading amount radially outward is controllable, a wall of the self-piercing rivet inner curvature and a rivet shaft outer circumference run together an edge angle of substantially 45°, at the placement edge, and the placement edge is rounded with a rounding radius of substantially 0.15 mm.

18. The self-piercing rivet joint as claimed in claim 5, wherein on the shaft tip facing away from the rivet head, a ring-shaped circumferential placement edge delimiting the inner curvature is formed, the placement edge acts as a cutting edge during the riveting procedure, using which, early compression of the self-piercing rivet can be suppressed, and, spreading out of the self-piercing rivet by a predefined spreading amount radially outward is controllable, a wall of the self-piercing rivet inner curvature and a rivet shaft outer circumference run together at an edge angle of substantially 45°, at the placement edge, and the placement edge is rounded with a rounding radius of substantially 0.15 mm.

19. The self-piercing rivet joint as claimed in claim 2, wherein in the undeformed state, the self-piercing rivet total length is between 4.5 mm and 6.0 mm, the rivet head diameter is between 5.5 mm and 7.75 mm, and the rivet shaft diameter is between 2.8 mm and 6.6 mm.

20. The self-piercing rivet joint as claimed in claim 3, wherein in the undeformed state, the self-piercing rivet total length is between 4.5 mm and 6.0 mm, the rivet head diameter is between 5.5 mm and 7.75 mm, and the rivet shaft diameter is between 2.8 mm and 6.6 mm.

* * * * *